2,881,192
Patented Apr. 7, 1959

2,881,192

METHOD OF ISOLATING AND PURIFYING KETO STEROIDS AND NEW KETO STEROID COMPOUNDS

Leon Velluz, Paris, France, assignor to Les Laboratoires Francais de Chimiotherapie, Paris, France, a French body corporate No Drawing. Application April 20, 1956
Serial No. 579,457

Claims priority, application France December 11, 1952

8 Claims. (Cl. 260—397.45)

The present invention relates to a process of purifying and isolating keto steroid compounds and more particularly to an improved process of selectively separating cortisone acetate from 3,11,20-triketo-17α,21-dihydroxy pregnane.

The present invention is a continuation-in-part of my co-pending application Serial No. 336,630, filed February 6, 1953, and entitled Method of Isolating and Purifying Keto Steroids and New Keto Steroid Compounds.

It is known that a very important advance in the art was made by suggesting to separate keto steroids from accompanying non-keto steroids by reacting the keto compounds with ketone reagents. Two of the best known examples of such separation processes are the isolation of the semicarbazone of trans-dehydroandrosterone, an important intermediate product in the synthesis of testosterone, from neutral cholesterol oxidation products, and the isolation of estrone from the urine of pregnant mares by means of the "reagents T and P" of Girard and Sandulesco. Reagents T and P permit the conversion of ketones into water soluble compounds in the form of hydrazones with quaternary ammonium residues.

The semicarbazones, however, are practically almost insoluble and, therefore, do not permit any fractionation of the keto steroids. The Girard and Sandulesco reagents produce excellent results either on account of the different speed of reaction of various hormones therewith, or on account of the differences in hydrolysis of such reaction products, or on account of the different pH-values required for splitting up the hydrazones T or P into their corresponding keto compounds on regeneration therefrom. But the working conditions with these reagents are so delicate that their application is rather restricted and requires rather large volumes of liquids which are cumbersome to handle.

As stated above the semicarbazones are, in general, completely insoluble. This is also true with dinitro phenyl hydrazones which are praised as being especially suitable for analytical purposes. These compounds, however, can be hydrolized only with difficulty. The oximes, other classic keto derivatives, are usually too soluble.

The heretofore used ketone reagents have the further disadvantage that they do not possess sufficiently selective reactivity with various keto steroids and that, therefore, they do not effect satisfactory separation of the most desired keto steroids.

It is one object of the present invention to provide a ketone reagent which allows selective precipitation of cortisone acetate from a mixture of cortisone acetate and 3,11,20-triketo-17α,21-dihydroxy pregnane as it is obtained, for instance, when working up the mother liquors from the manufacture of cortisone.

Another object of the present invention is to provide a new ketone derivative of cortisone acetate which can readily be hydrolyzed to cortisone acetate.

Still another object of the present invention is to provide a new ketone derivative of the acetate of 3,11,20-triketo-17α,21-dihydroxy pregnane.

Further objects of this invention will become apparent from the specification and the examples given therein.

The present invention consists in principle in using as ketone reagent for selectively precipitating reaction products of said ketone reagent with cortisone acetate from suitable starting materials and solutions, the hydrazide derived from diphenyl glycolic acid, also called benzilic acid. Said hydrazide will be designated herein and in the claims annexed hereto as "reagent B." It corresponds to the following formula

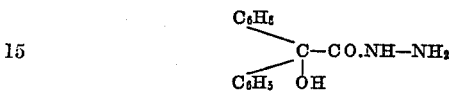

Cortisone acetate reacts with said hydrazide according to the following equation:

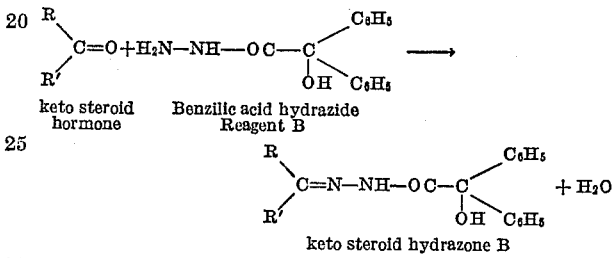

Said hydrazone is only slightly soluble, and, therefore, can readily be collected and separated from the reaction mixture, and is easily split up, thereby regenerating the keto steroid component thereof.

Benzilic acid hydrazide is a well known product and is produced according to the method of Curtius "Journal der praktischen Chemie," 2nd series, volume 95, page 196 (1917).

The hydrazone with cortisone acetate is produced, for instance, by reacting cortisone acetate or a mixture of cortisone acetate with other keto steroids and more particularly a mixture of cortisone acetate with the acetate of 3,11,20-triketo-17α,21-dihydroxy pregnane with said benzilic acid hydrazide in a suitable indifferent solvent and especially a solvent of neutral reaction. It is advisable to add to the mixture a small amount of an organic acid, such as acetic acid, which has a catalytic effect upon the reaction and accelerates the same. It is also possible to react the hydrazide and the keto steroid in pure acetic acid, i.e., without any indifferent solvent. Reaction takes place in the cold, after a more or less prolonged contact of the reaction components, or by heating the reaction mixture under reflux.

Reagent B reacts also with the acetate of 3,11,21-triketo-17α,21-dihydroxy pregnane and forms therewith a hydrazone of low solubility, for instance, in dichloro ethane but of high solubility in methanol. After filtering off or centrifuging the precipitated hydrazone B and subsequently recrystallizing said hydrazone, it can be hydrolyzed to regenerate and recover the free keto steroid compound. Such regeneration is usually effected by hydrolysis with mineral acids or strong organic acids or by double decomposition and exchange with an aldehyde or a ketone which possesses a much greater affinity to said reagent B than the keto steroid involved, whereby said aldehyde or ketone is preferably used in excess of the required amount in order to cause a shift of equilibrium. Benzaldehyde or pyruvic acid, for instance, are especially suitable for such exchange reaction, the latter compound being used advantageously in dilute acetic acid solution.

It is very surprising that such a great difference in solubility exists between the benzilic acid hydrazone of cortisone acetate and that of the acetate of 3,11,20-triketo-17α,21-dihydroxy pregnane, the more so in view of the fact that the hydrazides of quite related acids, namely of mandelic and diphenyl acetic acid, do not show such selective solubility. The mandelic acid hydrazones are almost all soluble under the usual reaction conditions when using methanol and ethanol as solvents. The diphenyl acetic acid hydrazones, on the other hand, do not show any differences in solubility; almost all of its hydrazones are insoluble so that no selective precipitation is achieved.

The process of reacting a keto steroid with reagent B according to the present invention may be employed with great advantage in the manufacture of cortisone. One step of the synthesis of this compound consists in oxidizing 11,20-diketo-3α,17α-dihydroxy-21-acetoxy pregnane to 3,11,20-triketo-17α-hydroxy-21-acetoxy pregnane. It was found that the small amounts of unoxidized starting material considerably disturb and impede the following reaction steps. It was found that purification by recrystallization does not yield satisfactory results and does not remove said impurity. This problem, however, is readily solved by employing the hydrazide of benzilic acid as reagent. With said reagent unoxidized 11,20-diketo-3α,17α-dihydroxy-21-acetoxy pregnane forms a hydrazone B which is readily soluble, for instance, in methanol while the hydrazone B of its triketo oxidation product is remarkably insoluble therein.

Hydrazone B of cortisone acetate of the following formula

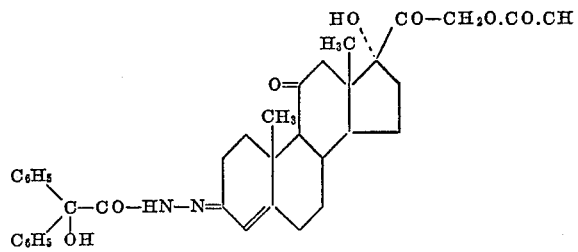

is soluble in dichloro ethane while the hydrazone B of the 4,5-saturated cortisone acetate of the following formula

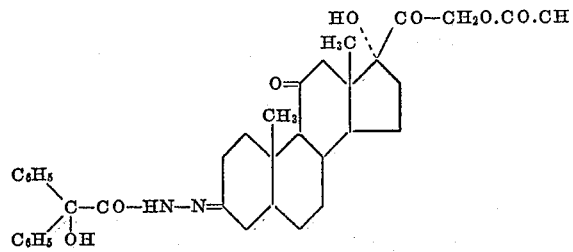

is not at all soluble therein.

One may proceed, without in any way departing from the principles of this invention, in such a manner that first the mixture of keto steroids is reacted with reagent B in a solvent wherein all the hydrazones B are soluble, whereafter one of the hydrazones B is precipitated by adding another solvent to the solution wherein said particular hydrazone B to be separated is insoluble. One may, of course, also evaporate to dryness the solution of the hydrazones B in a solvent wherein all of them are soluble, and may extract from the evaporation residue by means of another suitable solvent the one or the other of said hydrazones B. In cases in which the desired product contains only one impurity, one may react said impurity with reagent B to eliminate the same.

The following examples serve to illustrate this invention and some of the advantageous features thereof will appear from the description of preferred modes of carrying out the invention. It is to be understood, of course, that the invention is not limited to the precise order of steps of the processes set forth, as the invention can be embodied in a plurality and a variety of forms and can be practiced in a plurality and a variety of ways.

Thus one may use other indifferent solvents than those mentioned in the examples, such as isopropanol, dioxane, benzene, as well as other organic acids, alone or mixed, such as formic or tartaric acid.

The melting points given in the following examples were determined in the Maquenne block and indicate the point of instantaneous melting.

EXAMPLE I

*Hydrazone B of cortisone acetate and regeneration of cortisone acetate therefrom.*

50 g. of cortisone acetate (3,11,20-triketo-17α-hydroxy-21-acetoxy-Δ⁴-pregnene) and 33 g. of reagent B are boiled under reflux in 1 liter of methanol containing 10 cc. of acetic acid. After cooling the reaction mixture, the precipitated crystals are filtered off, washed, and dried. The yield is 96%. The benzilic acid hydrazone of cortisone acetate crystallizes in platelets which are insoluble in ether and only slightly soluble in chloroform and acetic acid. Melting point: 196° C.; specific rotatory power: $[\alpha]_D$: +235° to 240° (in 1% chloroform solution).

Said hydrazone B is hydrolyzed in the following manner:

50 g. of said hydrazone B are treated with a mixture of 200 cc. of glacial acetic acid, 20 cc. of pyruvic acid, and 10 cc. of water. The crystals obtained thereby are filtered off and washed first with a solution of 5% sodium bicarbonate and then with water. The washed product is dried. 30 g. of cortisone acetate are obtained. Melting point: 247° C.; specific rotatory power $[\alpha]_D$: +177° (in 1% acetone solution). Yield: 95%.

EXAMPLE 2

*Purification of cortisone acetate*

40 g. of impure cortisone acetate, melting at 230° C., are heated under reflux with 30 g. of reagent B in 1,000 cc. of methanol containing 1% of acetic acid. On cooling, hydrazone B of cortisone acetate melting at 196° C. and having a specific rotatory power of $[\alpha]_D$: +235–240° (in 1% chloroform solution), is obtained.

Said hydrazone B is hydrolyzed in the same manner as described in Example 1, thereby yielding cortisone acetate melting at 247° C. and having a specific rotatory power $[\alpha]_D$: +177° (in 1% acetone solution).

EXAMPLE 3

*Hydrazone B of 3,11,20-triketo-17α-hydroxy-21-acetoxy pregnane*

120 g. of reagent B and 100 g. of 3,11,20-triketo-17α-hydroxy-21-acetoxy pregnane are heated under reflux in 200 cc. of dichloro ethane. The reaction mixture is cooled, the precipitated crystals are filtered off, washed, and dried. 150 g. of the benzilic acid hydrazone of 3,11,20-triketo-17α-hydroxy-21-acetoxy pregnane are obtained corresponding to a yield of 95%. Said hydrazone B forms needles which melt at 210° C. and have a specific rotatory power of $[\alpha]_D$: +101° (in 1% pyridine solution). Yield: 95%. The hydrazone B is only slightly soluble in the ordinary solvents but is soluble in pyridine.

Said hydrazone B is decomposed in the following manner: 50 g. thereof are treated with a mixture of 200 cc. of glacial acetic acid, 20 cc. of pyruvic acid, and 10 cc. of water. The crystals formed thereby are washed with a 5% solution of sodium bicarbonate, subsequently with N hydrochloric acid, and finally with water. After drying, 30 g., corresponding to 95%, of 3,11,20-triketo-17α-hydroxy-21-acetoxy pregnane having a melting point of 231° C. and a specific rotatory power of $[\alpha]_D$: +82° (in 1% acetone solution), are obtained thereby.

EXAMPLE 4

*Purification of 3,11,20-triketo-17α-hydroxy-21-acetoxy pregnane*

20 g. of 3,11,20-triketo-17α-hydroxy-21-acetoxy pregnane containing, as impurity, 20% of 11,20-diketo-3α, 17α-dihydroxy-21-acetoxy pregnane are boiled under reflux in 350 cc. of methanol containing 1% of acetic acid, with 19 g. of reagent B. On cooling, 23 g. of crystals melting at 210° C. are obtained which represent the hydrazone B of the triketo compound. Hence, the yield is 95%.

Said hydrazone B is decomposed as described in Example 1 whereby pure 3,11,20-triketo-17α-hydroxy-21-acetoxy pregnane melting at 231° C. and having a specific rotatory power $[\alpha]_D: +82°$ (in 1% acetone solution) is obtained.

EXAMPLE 5

*Separation of cortisone acetate from the 21-acetate of 3,11,20-triketo-17α,21-dihydroxy pregnane*

43 g. of a residue obtained on evaporation of the mother liquors from the known cortisone manufacturing processes, which residue contains 3,11,20-triketo-17α,21-dihydroxy pregnane, are acylated by means of acetic acid anhydride and pyridine. The reaction product, which forms a yellowish gum, is dissolved, while heating to boiling, in 300 cc. of methanol containing 1% of acetic acid. A boiling solution of 26 g. of reagent B (excess of 10%) in 200 cc. of methanol containing 1% of acetic acid is added thereto and the mixture is heated under reflux on a water bath. The hydrazones B crystallize thereby. The mixture is allowed to stand overnight. The crystalline mass is centrifuged, washed with methanol, thereafter with N hydrochloric acid to eliminate the excess of reagent B, and finally with water, and is dried at 120° C. 45.8 g., corresponding to 68.5%, of a mixture of hydrazones B melting at about 200–210° C. are obtained.

Said 45.8 g. of hydrazones B are mixed with 200 cc. of dichloro ethane. The mixture is kept lukewarm on the water bath for several minutes and is then cooled to room temperature. The insoluble material is removed by filtration and is again mixed with 200 cc. of dichloro ethane. The mixture is treated as described above and the whole procedure is again repeated with 50 cc. of dichloro ethane. On drying, 26 g. of hydrazone B of 3,11,20-triketo-17α-hydroxy-21-acetoxy pregnane melting at 210° C., are obtained, corresponding to about 56.5% of the mixture used as starting material.

The dichloro ethane extracts are combined and distilled to dryness in a vacuum. 18.5 g., corresponding to 40%, of hydrazone B of cortisone acetate are obtained in crystalline form on addition of aqueous acetic acid.

On splitting up said two hydrazones B according to the methods described in the preceding examples, on the one hand, cortisone acetate, and, on the other hand, 3,11,20-triketo-17α-hydroxy-21-acetoxy pregnane are regenerated.

In place of cortisone acetate, other esters with lower alkanoic acids may also be used as starting material.

Of course, many changes and variations in the reaction conditions, the solvents used, the temperature and duration of the condensation reaction, the methods of isolating, purifying, and working up the hydrazones B, the manner in which said hydrazones B are decomposed and split up to the corresponding ketones and the like may be made by those skilled in the art in accordance with the principles set forth herein and in the claims annexed hereto.

I claim:

1. The 3-mono-benzilic acid hydrazone of a keto steroid compound selected from the group consisting of the ester of cortisone with a lower alkanoic acid and the ester of 3,11,20-triketo-17α,21-dihydroxy pregnane with a lower alkanoic acid.

2. The 3-mono-benzilic acid hydrazone of cortisone acetate.

3. The 3-mono-benzilic acid hydrazone of 3,11,20-triketo-17α-hydroxy-21-acetoxy pregnane.

4. In a process of purifying and isolating cortisone acetate from the 21-acetate of 3,11,20-triketo-17α,21-dihydroxy pregnane, the steps comprising dissolving said mixture in methanol containing acetic acid, adding thereto the hydrazide of benzilic acid, boiling the reaction mixture under reflux until condensation is completed, cooling the reaction mixture, separating the precipitated mixture of hydrazones B, mixing and moderately heating said mixture with dichloro ethane and repeating said mixing and moderately heating of the undissolved hydrazones B with dichloro ethane until no more hydrazone is dissolved, separating the undissolved hydrazone B of 3,11,20-triketo-17α-hydroxy-21-acetoxy pregnane from the dichloro ethane solutions, and removing the solvent from the combined dichloro ethane extracts, thereby yielding the hydrazone B of cortisone acetate.

5. In a process of purifying and isolating cortisone esters with lower alkanoic acids from a mixture containing such cortisone ester and the 21-ester of the corresponding pregnane compound, the steps comprising adding benzilic acid hydrazide to a solution of said esters in methanol, permitting said benzilic acid hydrazide to condense with said esters, extracting the hydrazone B of the cortisone ester from the resulting mixture of hydrazones B by means of dichloro ethane, isolating the hydrazone B of the cortisone ester from the dichloro ethane extract, and splitting up the resulting benzilic acid hydrazone of the cortisone ester to the substantially pure cortisone ester.

6. The process of purifying and isolating cortisone esters according to claim 5, wherein condensation of the mixture of cortisone esters and the esters of the corresponding pregnane compound is carried out while heating.

7. The process of purifying and isolating cortisone esters according to claim 5, wherein condensation is carried out in the presence of an acid agent.

8. The process of purifying and isolating cortisone esters according to claim 7, wherein the acid agent is acetic acid.

References Cited in the file of this patent

UNITED STATES PATENTS

| | | |
|---|---|---|
| 2,062,904 | Hartmann | Dec. 1, 1936 |
| 2,103,735 | Schoeller | Dec. 28, 1937 |
| 2,188,881 | Butenandt | Jan. 30, 1940 |

OTHER REFERENCES

Fieser et al.: Natural Products Related to Phenanthrene, 3rd edition, pages 308–309, 405–406 (1939).